No. 846,822. PATENTED MAR. 12, 1907.
A. W. BURNETT.
HARNESS ATTACHMENT.
APPLICATION FILED OCT. 5, 1906.
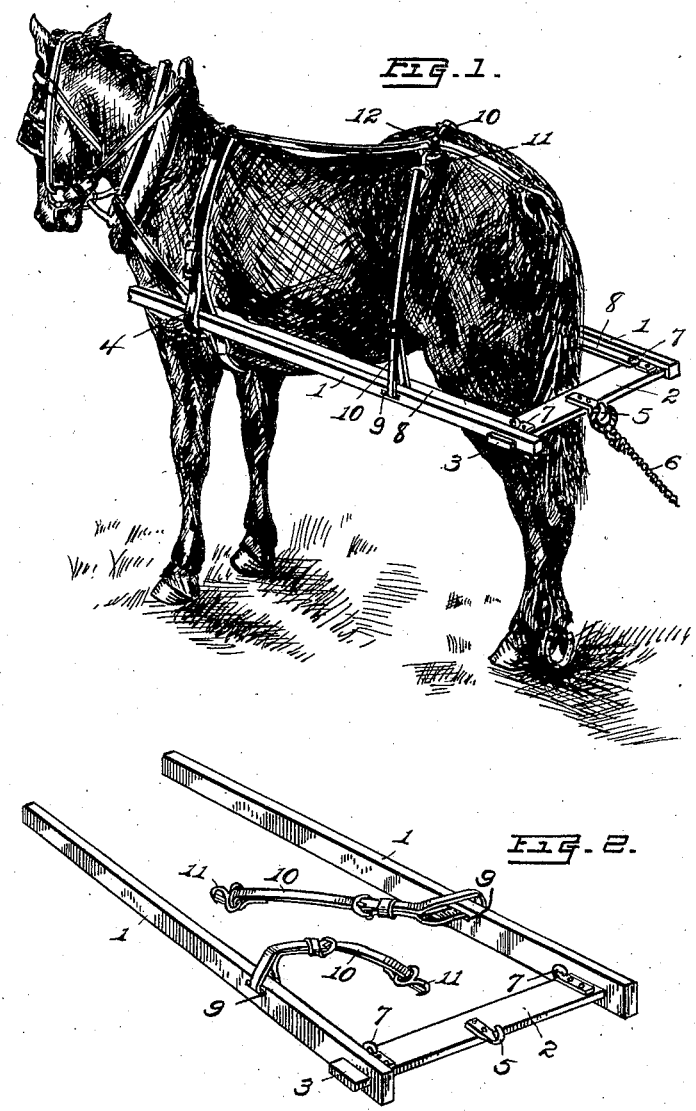

UNITED STATES PATENT OFFICE.

ALICE W. BURNETT, OF LISBON, OHIO.

HARNESS ATTACHMENT.

No. 846,822.  Specification of Letters Patent.  Patented March 12, 1907.

Application filed October 5, 1906. Serial No. 337,515.

*To all whom it may concern:*

Be it known that I, ALICE W. BURNETT, a citizen of the United States of America, and a resident of Lisbon, county of Columbiana, and State of Ohio, have invented certain new and useful Improvements in Harness Attachments, of which the following is a specification.

My invention relates to new and useful improvements in harness attachments; and it has for its primary object to provide a simple and cheap device dispensing with the ordinary swingletree in work where the draft or pulling force is intermittent, as in loading and unloading hay with a hay-fork and in like hoisting apparatus, and consequently obviating the annoyance incident to the use of a swingletree in such work, said annoyance consisting in having the swingletree drop down upon or against the horse's hind legs or heels when the pulling force is not being exerted or when the load is detached.

A further object of the invention is to provide a simple device which is readily applicable to any ordinary set of work-harness, requiring no change to be made in said harness and requiring but a moment's time to adjust in position.

With these and other objects in view the invention finally consists in the particular construction, arrangement, and combination of parts, which will hereinafter be fully described, reference being herein had to the accompanying drawings, forming a part of this specification, in which—

Figure 1 is a perspective view of a harnessed horse, showing my invention applied thereto; and Fig. 2 is a perspective view of the invention detached from the harness.

Referring to said drawings, in which like reference-numerals designate like parts throughout the several views, 1 and 1 indicate two substantially parallel horizontally-disposed bars of light material, which are connected at their rear ends by a transverse bar 2, the latter bar preferably having its ends 3 fitted in mortises in said bars 1, as shown. Said bars 1 are adapted for having their front ends mounted in and supported by the ordinary shaft-loops 4, carried by the harness, and the transverse bar 2 serves the purpose of an ordinary swingletree, it having mounted thereon intermediate its ends a draft-hook 5, to which the draft rope or cable 6 is attached, and also having mounted thereon near its opposite ends trace-hooks 7, to which the traces 8 are attached.

Provided at suitable points in the bars 1 are slots 9, in which are held adjustable supporting-straps 10, by means of which the rear end of the device is supported, said straps 10 preferably having snap-hooks 11 on their upper ends adapted for ready attachment to the ordinary hip-ring 12, carried by the harness; or in case snap-hooks are attached to the hip-ring, as is sometimes the case in ordinary harness, rings are carried by the supporting-straps for attachment to said snap-hooks.

As is apparent, the device is readily applicable to any ordinary work-harness without change being made in said harness. Further, the device is supported in a substantially stationary position clear of the horse's limbs, and it holds the end of the draft rope or cable off the ground, preventing the horse from becoming entangled therein.

To remove the device, the traces and supporting-straps have only to be disengaged from their respective fastenings—the trace-hooks and the hip-ring—when with the forward stepping of the horse the whole device drops to the ground.

Having thus described my invention, what I claim as new, and desire to secure by Letters Patent, is—

In a detachable harness attachment for use in connection with hoisting apparatus, the combination with an ordinary draft-harness having shaft-loops, of two substantially parallel bars having their front ends removably mounted in said loops, a transverse bar rigidly connecting the rear ends of said parallel bars, trace-hooks and a draft-hook fixed on said transvese bar, said parallel bars having slots therein, and adjustable supporting-straps having their ends attached to said bars in said slots, said straps having snap-hooks in their upper ends for attachment to the hip-ring of the harness.

In testimony whereof I affix my signature in presence of two subscribing witnesses.

ALICE W. BURNETT.

Witnesses:
 Mrs. JOHN A. MORROW,
 MAYME MARQUIS.